United States Patent
Würz et al.

[11] Patent Number: 5,989,657
[45] Date of Patent: Nov. 23, 1999

[54] TRIM STRIP

[75] Inventors: Peter-Ludwig Würz, Gescher; Heinz-Jürgen Bröckermann, Essen, both of Germany

[73] Assignee: W. Dollken & Co. GmbH, Essen, Germany

[21] Appl. No.: 08/972,181

[22] Filed: Nov. 18, 1997

[30] Foreign Application Priority Data

Jan. 18, 1997 [DE] Germany ............................ 197 01 594

[51] Int. Cl.⁶ .................................................. B60R 13/04
[52] U.S. Cl. ............................. 428/31; 428/343; 52/312; 52/716.5; 40/592; 40/593; 293/115; 293/128; D12/190
[58] Field of Search ............................ 428/31, 343, 161, 428/164; 52/312, 716.5; 40/592, 593; 293/115, 128; D12/190

[56] References Cited

U.S. PATENT DOCUMENTS

| | | | |
|---|---|---|---|
| 4,101,698 | 7/1978 | Dunning et al. | 428/31 |
| 4,668,543 | 5/1987 | Schlenz | 428/31 |
| 4,877,657 | 10/1989 | Yaver | 428/31 |

FOREIGN PATENT DOCUMENTS

| | | |
|---|---|---|
| 3802396 | 8/1988 | Germany . |
| 3930830 | 9/1989 | Germany . |
| 94 07 401 U | 11/1994 | Germany . |

*Primary Examiner*—Timothy Speer
*Assistant Examiner*—Bryant Young
*Attorney, Agent, or Firm*—Herbert Dubno; Andrew Wilford

[57] ABSTRACT

A trim strip has a bar of an at least partially transparent plastic having parallel inner and outer faces, an opaque decor layer laminated to the inner face, and a layer of adhesive on the opaque decor layer. The trim strip is adhered to a board edge with the decor layer against the board edge and the outer face directed away therefrom, and edges of the trim strip at the outer face are machined with removal of material so that the decor layer is left exposed through the bar at the machined edges.

11 Claims, 2 Drawing Sheets

TRIM STRIP

FIELD OF THE INVENTION

The present invention relates to a trim strip. More particularly this invention concerns a mainly plastic strip used to cover the edge of a decor-faced board of plywood, chipboard, or the like.

BACKGROUND OF THE INVENTION

Furniture nowadays is typically made of boards manufactured as plywood, particleboard, chipboard, or the like having at least one face covered with a decor layer or veneer, typically with wood grain to give the appearance of a solid piece of wood. The core is a pressed-together mass of particles or fibers or crossing layers of wood. Such boards are extremely strong, dimensionally stable, and inexpensive, but they have the disadvantage that their core materials are clearly visible at the edges.

Thus it is standard to cover the edges with a trim strip having a matching finish, normally woodgrain or veneer. Such a strip typically comprises a layer of plastic laminated with a decor layer. The strip is glued to the edge of the manufactured board and trimmed to fit.

The disadvantage of this system is that if the edges of the thus trimmed board are rounded or chamfered, the decor layer is removed and either the underlying plastic layer of the trim strip or the interior of the board is exposed. If left alone the effect is unattractive at best, and touching up this edge is a fairly difficult job that rarely will pass any meaningful scrutiny. Another disadvantage is that the trim strip is frequently subject to substantial abuse, if only from periodic cleaning, so that the decor layer can be chipped and/or worn off, revealing the core material it was intended to hide.

OBJECTS OF THE INVENTION

It is therefore an object of the present invention to provide an improved trim strip.

Another object is the provision of such an improved trim strip and method of using same which overcome the above-given disadvantages, that is which ensure that even if the strip is machined or worn substantially it will continue to hide and cover the core material is it applied over.

SUMMARY OF THE INVENTION

A trim strip according to the invention has a bar of an at least partially transparent plastic having parallel inner and outer faces, an opaque decor layer laminated to the inner face, and a layer of adhesive on the opaque decor layer. The trim strip is adhered to a board edge with the decor layer against the board edge and the outer face directed away therefrom, and edges of the trim strip at the outer face are machined with removal of material so that the decor layer is left exposed through the bar at the machined edges.

The transparent (which term here is intended to cover translucent) bar is therefore provided outside the decor layer so that if it is trimmed or machined, or even just worn away by normal use and cleaning, the underlying decor layer will remain. The so-called picture-frame effect produced in the prior-art systems when the edges are rounded or otherwise profiled is completely avoided.

According to the invention decor particles, e.g. pigment powder or metal dust, are imbedded in the bar at the inner face thereof. They can be imbedded in the bar, or captured between its inner or bottom face and the decor later. According to a further feature of the invention the edges of the bar are profiled.

It is also possible in accordance with the invention to texture at least one of the faces of the bar. This can be done by rollers after application of the decor layer to the bar's inner face.

The decor layer can be applied to the inner face by printing on the inner face. It can itself constitute an adhesive, for instance a thermally activated or pressure-sensitive one used to secure the strip to a board edge with the decor layer directly engaging the board edge. Alternately the decor layer can be a metallic, paper, or plastic foil or film. The decor layer can have a woodgrain matching that of the board the trim strip is being used on.

In accordance with the invention a second such transparent plastic bar is fixed to the outer face with its outer face against the outer face of the first-mentioned bar and a second such opaque decor layer is applied to the inner face of the second bar. Then the trim strip is mounted on a board edge with one of its decor layers directly engaging the board edge, and thereafter edges of the trim strip are machined with removal of part of the other decor layer. Decor particles can be imbedded in one of the bars at the respective inner face.

In general the invention also comprises a method of using a trim strip having a bar of an at least partially transparent plastic having parallel inner and outer faces, an opaque decor layer laminated to the inner face, and a layer of adhesive on the opaque decor layer. This method comprises the steps of adhering the trim strip to a board edge with the decor layer against the board edge and the outer face directed away therefrom, and machining edges of the trim strip at the outer face with removal of material so that the decor layer is left exposed through the bar at the machined edges.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
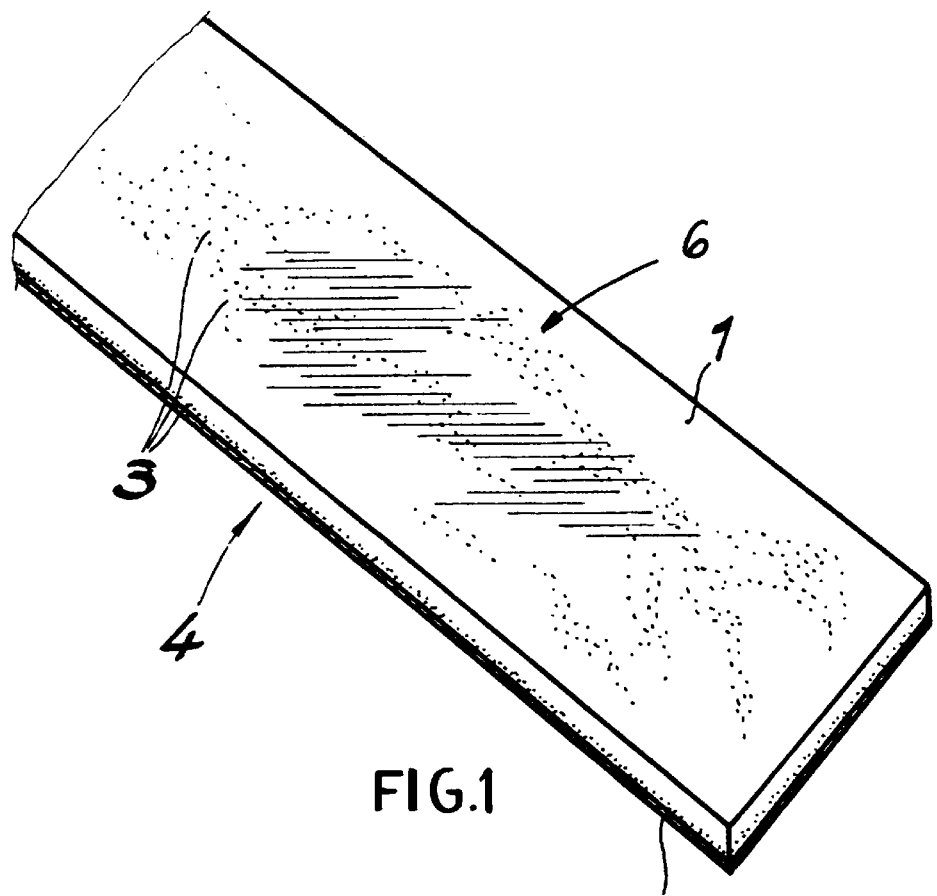
FIGS. 1 and 2 are perspective views of two trim strips according to the invention.

As seen in FIG. 1 a trim strip according to the invention comprises a transparent, which here is intended to include translucent, and relatively thick bar or layer 1 of plastic, e.g. polyvinylchloride or polypropylene, and a relatively thin bottom opaque layer 2 that carries a pattern or color, e.g. wood grain, a color, or a metallic finish. Decor particles 3, e.g. metal or pigment powder, are imbedded in the layer 1 and/or captured between the layers 1 and 2. The decor layer 2 is visible through the front face 6 and edges 4 of the trim strip.

Figure 2:
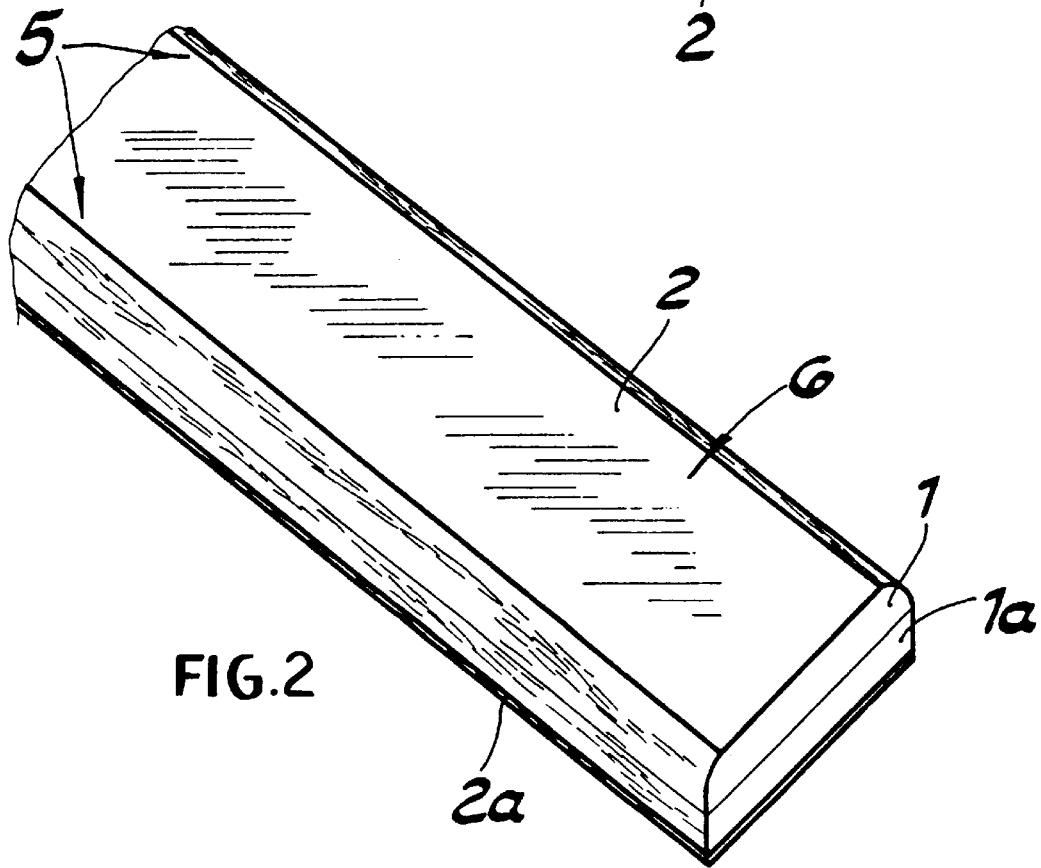
Figure 3:
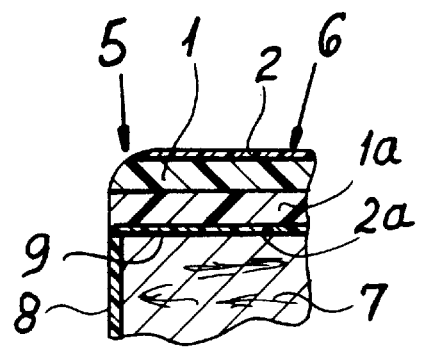
FIG. 3 is a cross section through the trim strip of FIG. 2 installed on a board edge.

FIGS. 2 and 3 show a similar such construction, but where a second such strip having a transparent layer 1a and decor layer 2a are laminated together with the decor layers 2 on the two outer faces. The decor layer 2a is secured by an adhesive layer 9 to an edge of a particleboard 7 having a decor layer or veneer 8 on one face, and the edges are rounded at 5. Thus seen from the outer face 6, where the outer layer 2 has been removed at the edges, the lower foil 2a will be visible through the layers 1 and 1a, presenting a finished uniform appearance.

Figure 4:
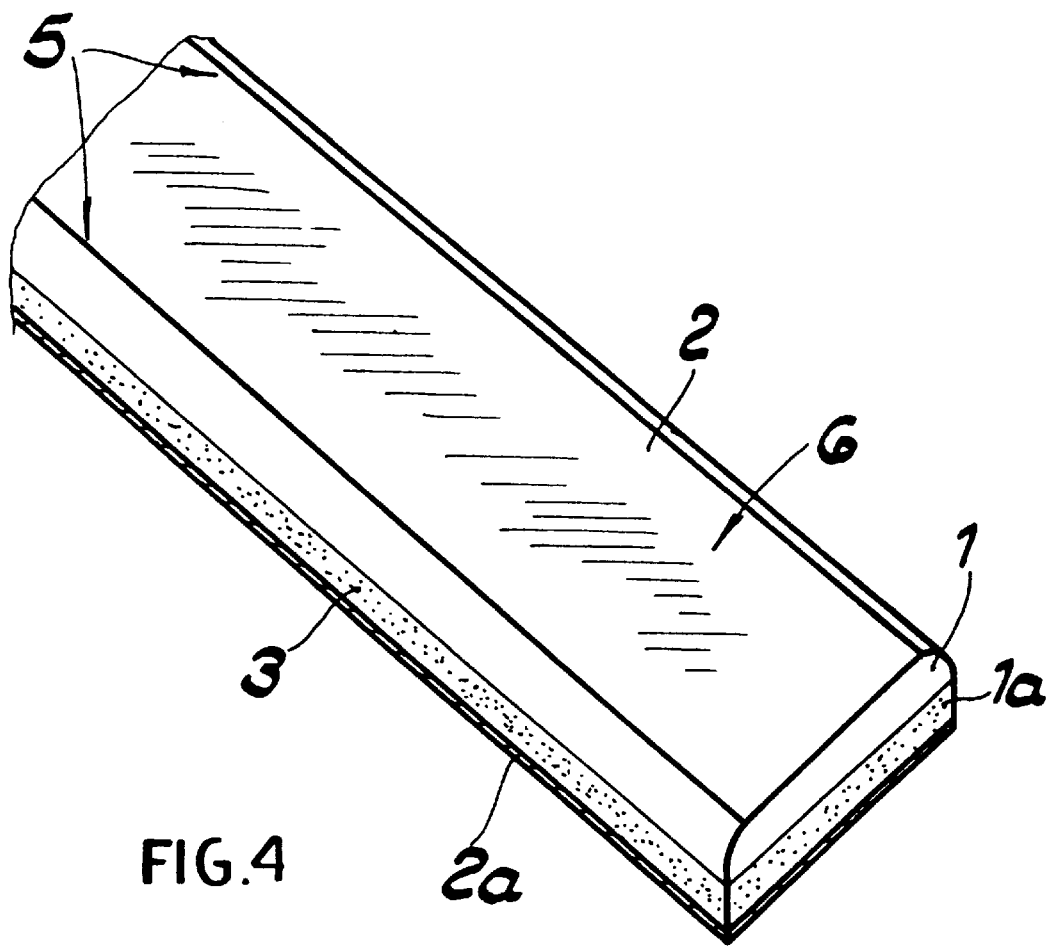
FIG. 4 is a perspective view of another trim strip according to the invention.

In FIG. 4 the structure is identical to that of FIGS. 2 and 3 except that decor particles 3 are imbedded in the layer 1a.

We claim:

1. In combination with a board having an edge, a trim strip comprising:
    a bar of an at least partially transparent plastic having parallel inner and outer faces;
    an opaque decor layer laminated to the inner face; and
    a layer of adhesive on the opaque decor layer securing the trim strip to the board edge with the decor layer against the board edge and the outer face directed away therefrom.

2. The combination defined in claim 1, further comprising decor particles imbedded in the bar at the inner face thereof.

3. The combination defined in claim 1 wherein edges of the bar are profiled.

4. The combination defined in claim 1 wherein at least one of the faces of the bar is textured.

5. The combination defined in claim 4 wherein the inner face of the bar is textured over the decor layer.

6. The combination defined in claim 1 wherein the decor layer is printing applied to the inner face.

7. The combination defined in claim 6 wherein the decor layer includes the adhesive.

8. The combination defined in claim 1 wherein the decor layer is a foil.

9. A trim strip comprising:
    a bar of an at least partially transparent plastic having parallel inner and outer faces;
    an opaque decor layer laminated to the inner face;
    a layer of adhesive on the opaque decor layer, whereby the trim strip can be secured to a board edge with the decor layer against the board edge and the outer face directed away therefrom;
    a second such transparent plastic bar fixed to the outer face with its outer face against the outer face of the first-mentioned bar; and
    a second such opaque decor layer is applied to the inner face of the second bar, edges of the second bar being machined with removal of part of the other decor layer.

10. The trim strip defined in claim 9, further comprising decor particles imbedded in one of the bars at the respective inner face.

11. The combination defined in claim 1, further comprising
    another opaque decor layer on the outer face, edges of the trim strip being machined with removal of part of the other decor layer.

* * * * *